US005776881A

United States Patent [19]

Kiany

[11] Patent Number: 5,776,881

[45] Date of Patent: Jul. 7, 1998

[54] ENHANCED SOLVENT COMPOSITION

[75] Inventor: Esfandiar Kiany, Chicago, Ill.

[73] Assignee: Safety-Kleen Corp., Elgin, Ill.

[21] Appl. No.: 678,467

[22] Filed: Jul. 3, 1996

Related U.S. Application Data

[63] Continuation of Ser. No. 271,847, Jul. 7, 1994, abandoned.

[51] Int. Cl.$^{6}$ .............................. C11D 3/44; C11D 7/50; B01D 21/01

[52] U.S. Cl. .............................. 510/407; 510/108; 510/417; 510/418; 510/505; 510/506; 210/708; 210/727; 210/728; 210/729; 8/141

[58] Field of Search .............................. 510/407, 417, 510/418, 505, 506, 108; 210/728, 729, 725, 727, 708; 8/141

[56] References Cited

U.S. PATENT DOCUMENTS

| | | | |
|---|---|---|---|
| 1,766,067 | 6/1930 | De Groote et al. . | |
| 2,552,528 | 5/1951 | De Groote . | |
| 2,552,529 | 5/1951 | De Groote . | |
| 2,900,350 | 8/1959 | Kirkpatrick . | |
| 2,944,982 | 7/1960 | De Groote et al. . | |
| 2,996,551 | 8/1961 | De Groote et al. . | |
| 3,110,736 | 11/1963 | De Groote et al. . | |
| 3,110,737 | 11/1963 | De Groote et al. . | |
| 4,029,702 | 6/1977 | Piccolini | 260/554 |
| 4,306,981 | 12/1981 | Blair, Jr. | 252/8.55 |
| 4,321,146 | 3/1982 | McCoy et al. . | |
| 4,321,147 | 3/1982 | McCoy et al. . | |
| 4,407,706 | 10/1983 | Merchant, Jr. et al. | 204/190 |
| 4,407,707 | 10/1983 | Merchant, Jr. et al. . | |
| 4,416,754 | 11/1983 | Merchant, Jr. et al. . | |
| 4,477,286 | 10/1984 | Rossmann et al. . | |
| 4,551,239 | 11/1985 | Merchant et al. . | |
| 4,737,265 | 4/1988 | Merchant, Jr. et al. . | |
| 4,749,509 | 6/1988 | Kacher | 252/139 |
| 4,753,661 | 6/1988 | Nelson et al. | 44/53 |
| 4,810,263 | 3/1989 | Zimmerman et al. | 44/72 |
| 4,836,829 | 6/1989 | Zimmerman et al. | 44/53 |
| 4,938,877 | 7/1990 | Bock et al. | 210/723 |
| 5,232,632 | 8/1993 | Woo et al. | 252/546 |
| 5,256,305 | 10/1993 | Hart . | |
| 5,447,638 | 9/1995 | Holdar et al. | 210/728 |
| 5,460,817 | 10/1995 | Langley et al. | 424/408 |

*Primary Examiner*—Paul Lieberman
*Assistant Examiner*—Lorna M. Donyon
*Attorney, Agent, or Firm*—James T. Fitzgibbon

[57] ABSTRACT

A treated solvent composition for washing mechanical parts or the like. The solvent contains not more than about 25% aromatic solvents with the balance being aliphatic and other non-aromatic solvents having a flashpoint of at least 100° F. The solvent is treated with up to 10 parts of an additive composition selected from the group consisting of $C_{14}$ and lower alcohols, diols, polyols, lower glycols, and lower glycol ethers and mixtures thereof. In use, finely dispersed contaminant particles settle from the body of the solvent more rapidly than in untreated solvent and the resulting clarified appearance enables the solvent to be used longer and more effectively in a cleaning operation.

19 Claims, 5 Drawing Sheets

ENHANCED SOLVENT COMPOSITION

This application is a continuation of Application Ser. No. 08/271,847, filed Jul. 7, 1994 now abandoned.

BACKGROUND OF THE INVENTION

The present invention relates generally to automotive, industrial, and commercial parts cleaning, and, more particularly, to improved formulations for enhancing the effectiveness of cleaning solvents.

In industry today, there has been an increasing awareness of the importance of washing mechanical parts. In almost every repair, reconstruction, and rebuilding of motors, engines, and/or machines, it is necessary to clean oily, greasy, or otherwise dirty or contaminated parts before they can be repaired and reassembled. Further, in a number of cases, machining and refabricating operations, particularly those carried out on metal parts, leave residues or contaminants which are desirably cleaned before the part or component in question is reassembled or otherwise the subject of a completed operation.

In most cases, the kind of dirt and contamination which has accumulated on metal parts is that of an oily, greasy residue. In the case of automotive, truck, agricultural, and earth-moving construction machinery components, the parts in question gradually become covered with oil or grease that has leaked from the crankcases or gear housings of the machines, and these in turn attract dust, sand, dirt, and other constituents of the environment in which they work. Almost all oils and greases have the capability not only of attracting dust and dirt, but also, in effect, of acting as an adhesive for these and other contaminants.

Normally, for reasons of rust prevention, and particularly for reasons of solubility, such parts, being possessed of an oily, greasy residue, are best cleaned using hydrocarbon-based solvent systems rather than aqueous systems. The use of aqueous systems calls for using large quantities of water and requires emulsifying the oil and grease that is, in effect, serving as a dirt binder. Such cleaning, while effective if conducted properly, involves time-consuming washing/emulsification/saponification steps followed by rinsing and subsequent application of a corrosion inhibitor coating. Accordingly, rather than pursue this method, most parts are simply washed in a hydrocarbon-based solvent that is compatible with the oils and greases in question, and which therefore serves to remove the dirt quite rapidly and effectively. This is particularly true when combined with a scrubbing or mechanical agitation action, i.e., brushing or dipping and agitating of parts, or both.

In connection with the use of hydrocarbon-based solvents, certain problems arise. These include environmental and fire hazard concerns, one consequence of which has been the increasing use of relatively high flashpoint solvents. In many cases, these solvents used have a flashpoint of 100° F. or above and are primarily aliphatic in nature with a certain aromatic constituent. Newer solvents have a 150° F. or higher flashpoint and are predominantly or almost exclusively aliphatic.

Referring to the equipment used in parts washing, while simple dip tanks have been known to be used with some effectiveness, the most cost- and labor-effective method of small-scale parts washing, (i.e., that carried on in maintenance, repair, and rebuild shops and garages and industrial fabrication and assembly facilities of all sizes), has been to use parts washers which include a sink or the like positioned atop a reservoir of hydrocarbon-based solvent and wherein this solvent is circulated from the reservoir though a pump and directed over the parts being cleaned from a nozzle at the end of a conduit or the like. Parts washers using such hydrocarbon-based solvents include those of the general type described in U.S. Pat. No. 3,522,814, of which many hundreds of thousands have been sold and/or in use.

Referring again to automotive, industrial, and commercial parts washing, when the cost of hydrocarbon-based solvent was very low and the regulatory atmosphere was somewhat lax, it was not uncommon to provide a rather crude filter to be used with such solvent and for the solvent to be changed by a route or serviceman every two to four weeks. The used solvent would be picked up by the route man, who then furnished a charge of new solvent for the parts washer. This cycle would commonly be repeated on a two to four week cycle.

When hydrocarbon-based solvent prices were low, this was an economical, common sense approach to parts washing problems. The combination of the relatively crude filter and simple gravity settling provided a gross separation of contaminants which was satisfactory for the times in question. Now, however, hydrocarbon-based solvent costs are much higher, and environmental regulations are such that it is much more desirable to ensure maximum use and re-use of a particular charge of solvent. However, this desirable state of affairs has not heretofore been able to be fully achieved in practice.

One characteristic of parts washer solvent that has been subjected to even comparatively few washing cycles is that the dirt entrained therein includes finely dispersed particles, many of which may range from 70 microns to sub-micron size, such as 0.5 microns or less. While sand, gravel, metal filings, and the like cleaned from dirty or greasy parts rapidly settle out, a significant portion of the contaminants in solvent used for parts washing is comprised of very fine particles that are resistant to settling. By far the largest concentration is in the 10–20μ particle size range. As a result, the solvent's cleaning effectiveness may not be impaired, but due to the dispersed and unsettled contamination, it may be difficult to determine this condition visually. Consequently, such solvent may be changed more often than is needed to meet cleaning requirements.

If it were possible to achieve a greater separation of dirt and particles from the mass of solvent within a finite time, say fifteen minutes to one hour, the effectiveness and useful lifetime of the parts cleaning solvent would be greatly increased. It is possible that, by positioning the liquid pump inlet an appropriate distance from the bottom of the reservoir, if there were highly effective gravity separation of contaminants, the pump could circulate comparatively clean solvent. If this were the case, the contaminants would continue to self-separate by gravity and the supernatant liquid within the reservoir would remain clean and be able to be used over a much longer period of time.

In speaking of reclamation of hydrocarbon solvents, being that the current regulatory atmosphere in some ways promotes this practice, when recycling of the hydrocarbon-based solvent used in parts cleaning is called for, i.e., by filtration, distillation of the solvent at a recycle center, and/or by various other commonly known methods, an economic price is extracted both for recycling very dirty solvent and also for distilling solvent that has sufficient solids suspended so as to be of reduced effectiveness in use as a cleaning material.

If it where the case that a greater separation could be achieved of the dirt and particles in used or spent hydrocarbon-based solvent, recycling would be simplified in that the major portion of the contaminants could be removed into a contaminant rich layer by physical separation, thus reducing the accumulation of sludge in the distillation phase of recycling. Heat transfer would be better and equipment damage would be minimized if the solvent that was ultimately recycled by distillation were cleaner when entering the distillation phase of recycling.

While it is not known with certainty all the reasons why the contaminants in parts cleaning hydrocarbon-based solvent are apparently so highly resistant to gravity separation, it is known that modern motor oil, cutting and machining fluids, and grease formulations include detergent/dispersant additives which form a part of the dirt and grime which accumulates on mechanical parts, both inside and outside sealed machine areas. The detergent/dispersant additives remaining in these oil, fluid, and grease residues may serve to suspend contaminants within the cleaning solvent and impede their separation by gravity or filtration.

In any case, it would be considered extremely advantageous to provide a cleaning solvent that could be modified at low cost to provide much better separation of a wide size range of fine particles from parts washer solvent ("PWS") than is presently able to be achieved.

It would also be considered advantageous to provide a solvent composition that could be regenerated on the job by adding thereto materials which would restore or enhance previously existing settling out capability of the solvent.

It would also be very helpful to the potential for recycling if an additive which promoted settling could be discovered, which additive would remain as an effective additive even after the parts washer solvent had been subjected to one or more distilling operations.

It would be considered even further advantageous if an additive were to be provided for parts washer solvent or other cleaning solvent that would be compatible with or enhance the action of other additives intended to accelerate settling in uncontaminated solvent or restore improved contaminant settling characteristics to contaminated solvent.

SUMMARY OF THE INVENTION

Accordingly, it is the object of the present invention to provide a modified and improved parts washer solvent.

It is another object of the invention to provide an enhanced or modified solvent, the composition of which could be altered or modified during use to restore its original cleaning effectiveness and ability to effect separation of dirt and contaminants.

A further object of the invention is to provide a modified or enhanced solvent that is economical and not environmentally objectionable.

A still further object of the invention is to provide an enhanced solvent that greatly accelerates separation of dirt and fine particles and remains effective after solvent reclamation and/or solvent recycling conducted by various methods, such as by distillation.

A further object of the invention is to provide a solvent enhancer that is physiologically benign and that is effective in small concentrations.

An additional object of the invention is to provide an enhanced solvent which is able to effect accelerated particle settling action within the body of solvent used for cleaning purposes.

A still further object of the invention is to provide an enhanced solvent that provides effective and improved cleaning through extended use.

A still further object of the invention is to provide an enhanced solvent that facilitates easier initial separation of contaminants for more efficient and cost effective recycling.

Yet another object of the invention is to provide an improved solvent wherein fine particles, in use, settle out and leave a relatively clear supernatant layer which visually indicates that the solvent retains effective cleaning or parts washing potential.

A still further object of the invention is to provide an improved solvent that is advantageous in many applications, including but not being limited to parts washing.

Another object of the invention is to provide a solvent composition which has an improved effectiveness that is not compromised by the presence of foreign materials encountered during cleaning, such as water.

A further object of the invention is to provide one or more modifying compositions for use with hydrocarbon based solvents to extend their useful lives as cleaning compositions.

A still further object is to provide a hydrocarbon based solvent containing a minor proportion of effective modifying ingredients that enable parts washer users to achieve significant economies and environmental advantages in the use of the composition.

Yet another object of the invention is to provide a modified solvent composition wherein the composition as a whole is free from corrosive properties and is stable throughout a wide range of temperatures, including those encountered in pickup and delivery through various locations throughout North America.

The invention achieves its objects, and others which are inherent in the invention, by providing an aliphatic hydrocarbon or mineral-spirits-based cleaning solvent composition which includes from about 1/10 of 1% up to about 10% of a polar solvent (e.g. $C_6$–$C_{14}$ alcohols, diols, polyols and glycol ethers) selected from a group which includes lower alcohols, glycols, and glycol ethers having a carbon atom content of 1 to 10, and preferably including $C_8$ alcohols or diols, glycols, or glycol ethers which provide improved settling action, which are retained in the solvent after cleaning by distillation and which are compatible with additional clarifying agents.

In another aspect, the invention includes a solvent modified as just referred to, and in further combination with certain alkyl and/or aryl sulfonic acids, including petroleum-derived sulfonic acids and their salts, modified phenolic resin compositions, polyol esters, and other additives which are particularly effective in the presence of minor proportions of water.

The manner in which the foregoing and other objects and advantages of the invention are achieved in practice will become more apparent when reference is made to the following detailed description of the invention in which a number of examples embodying the invention are set forth in tabular and narrative form.

BRIEF DESCRIPTION OF THE DRAWINGS

Chart 1 shows particle size distribution of some representative spent parts washer solvents that require treatment according to the invention.

Chart 2 shows the effect of active ingredients on the settling rate of suspended particles in spent P-150 parts washer solvent.

Figure 1:
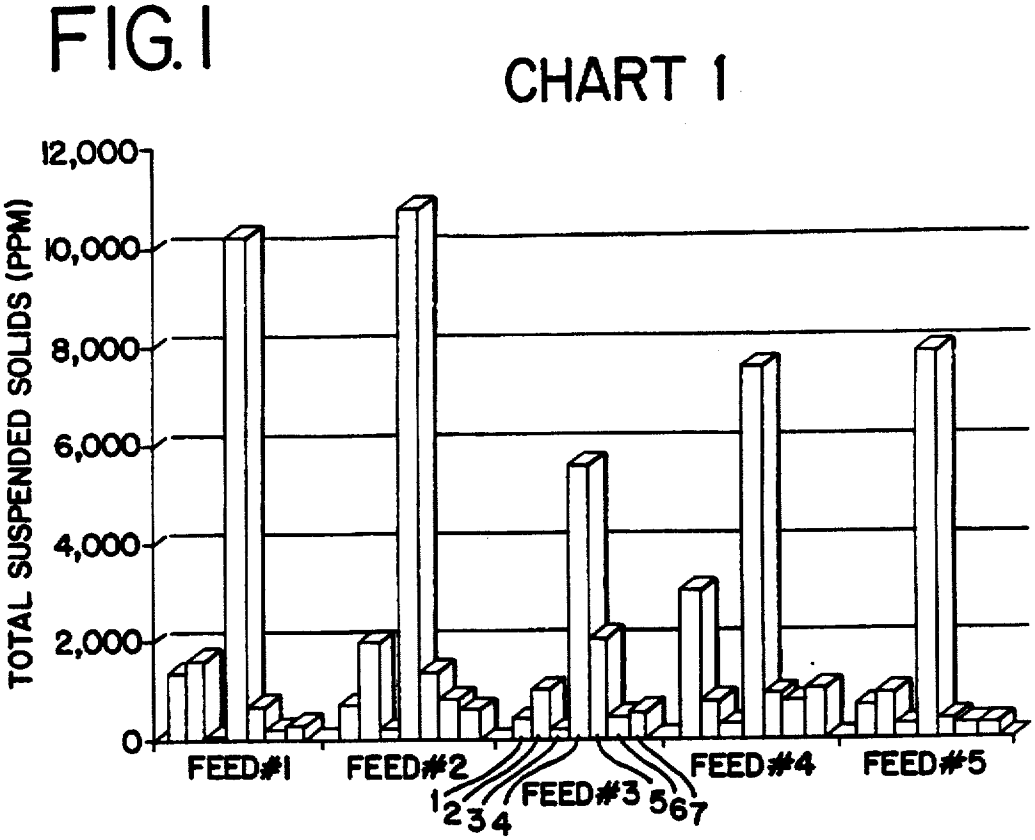
Figure 2:
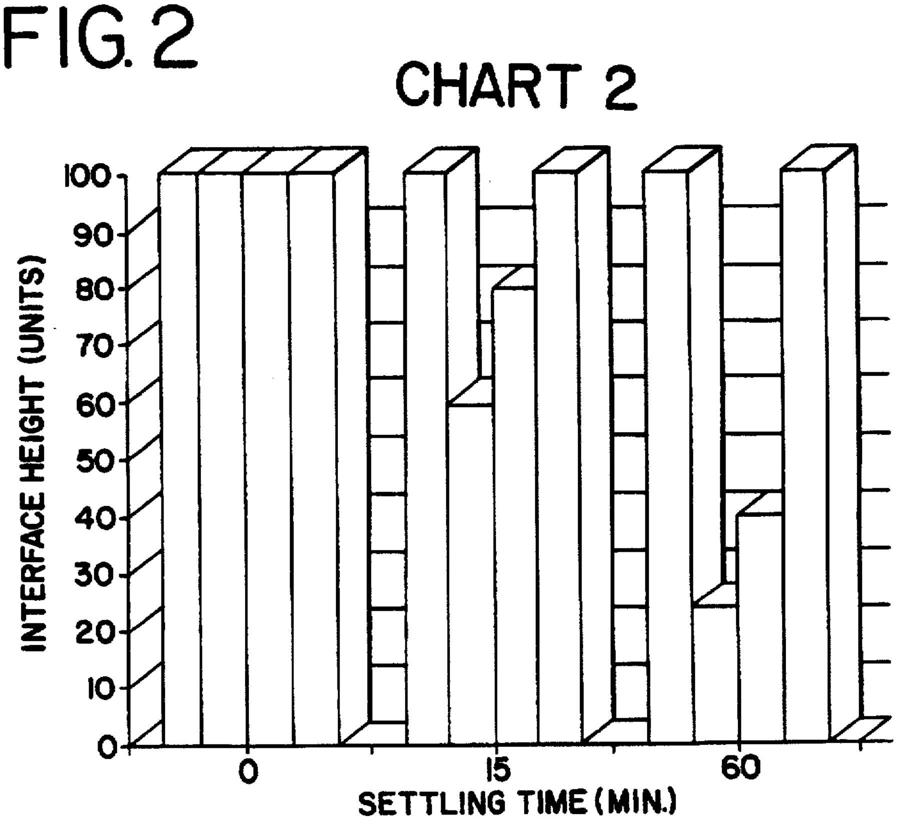
Figure 3:
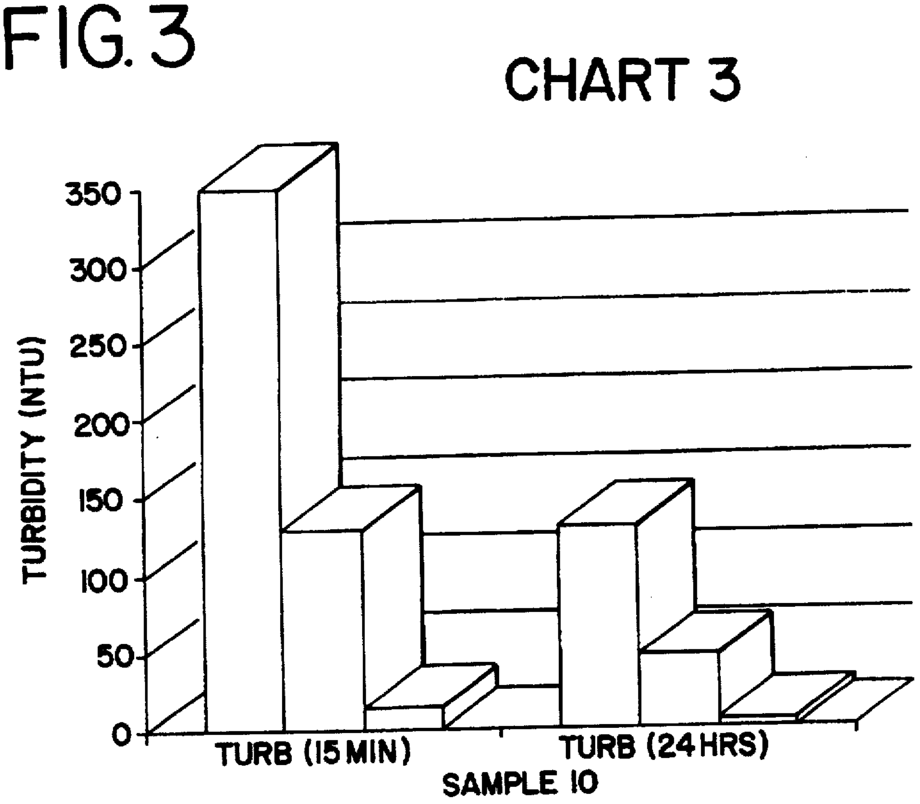
Figure 4:
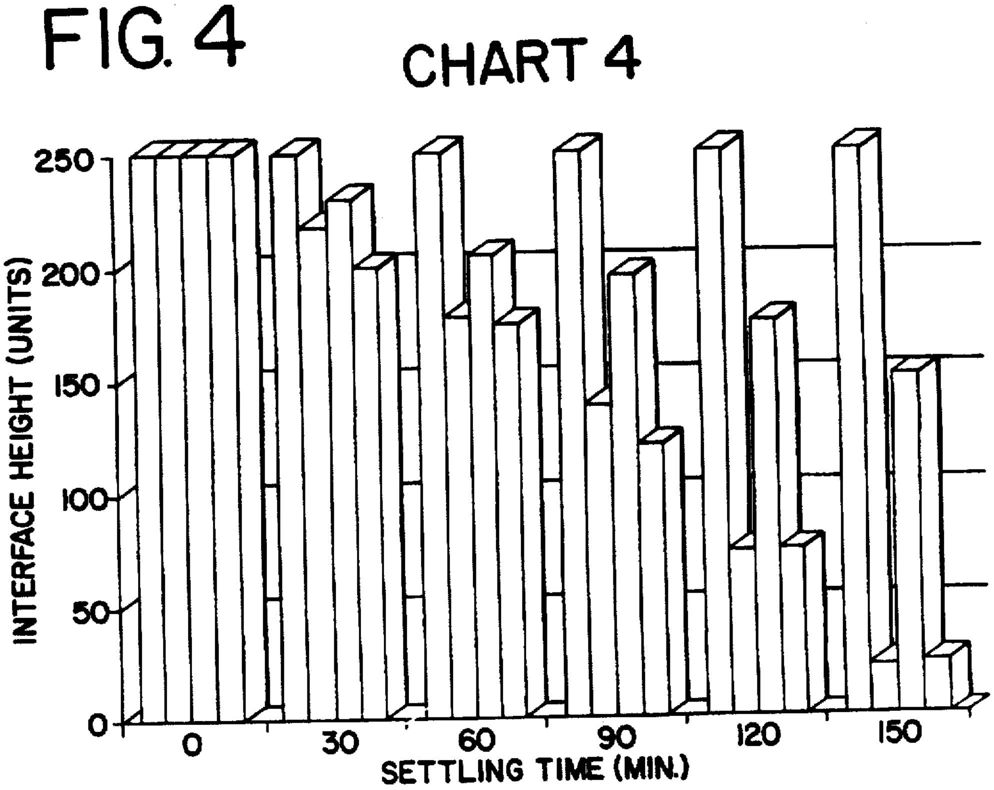
Figure 5:
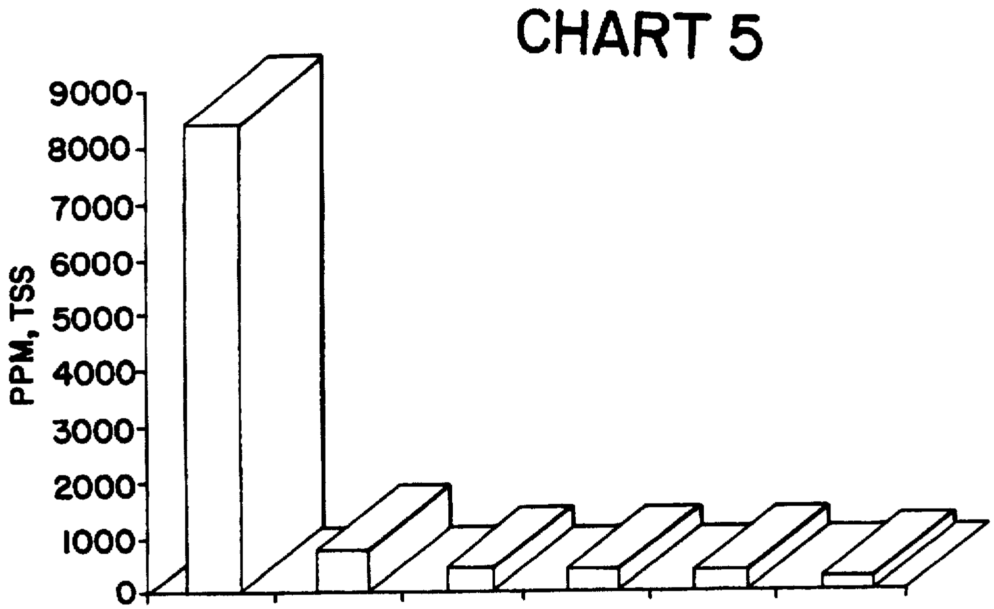
Figure 6:
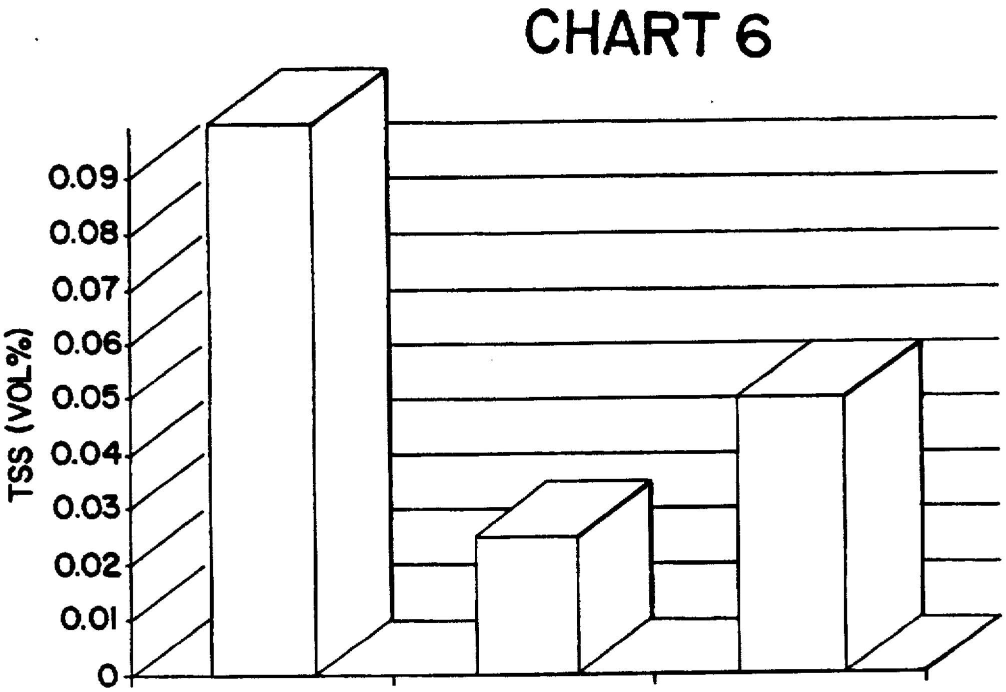
Figure 7:
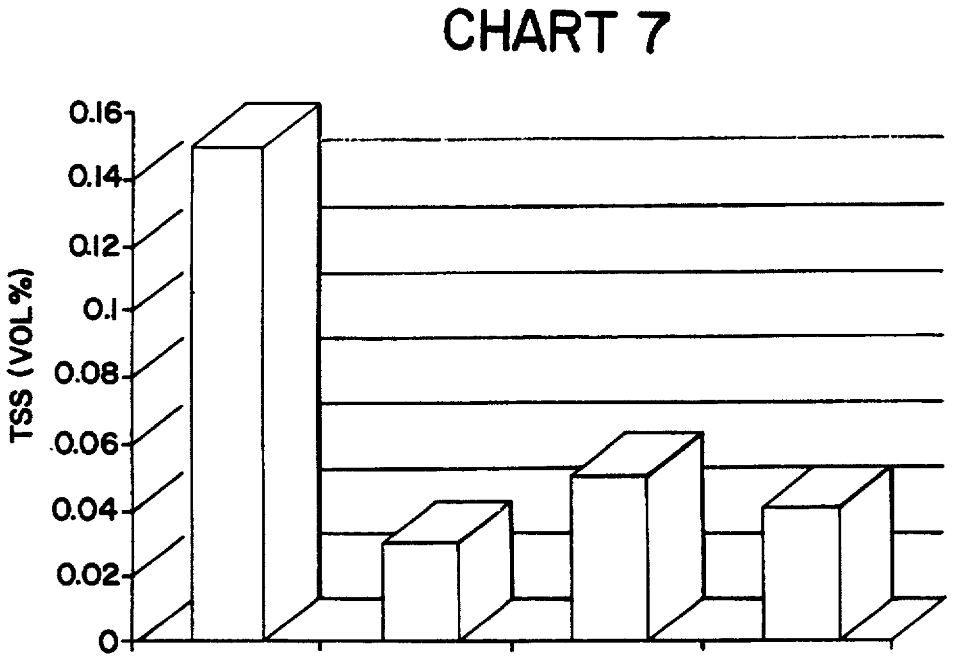
Figure 8:
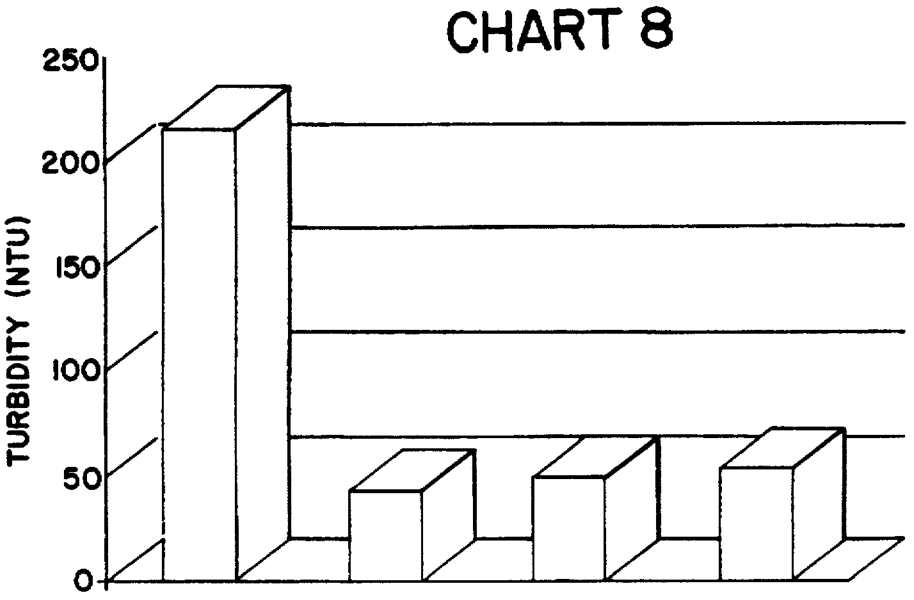
Figure 9:
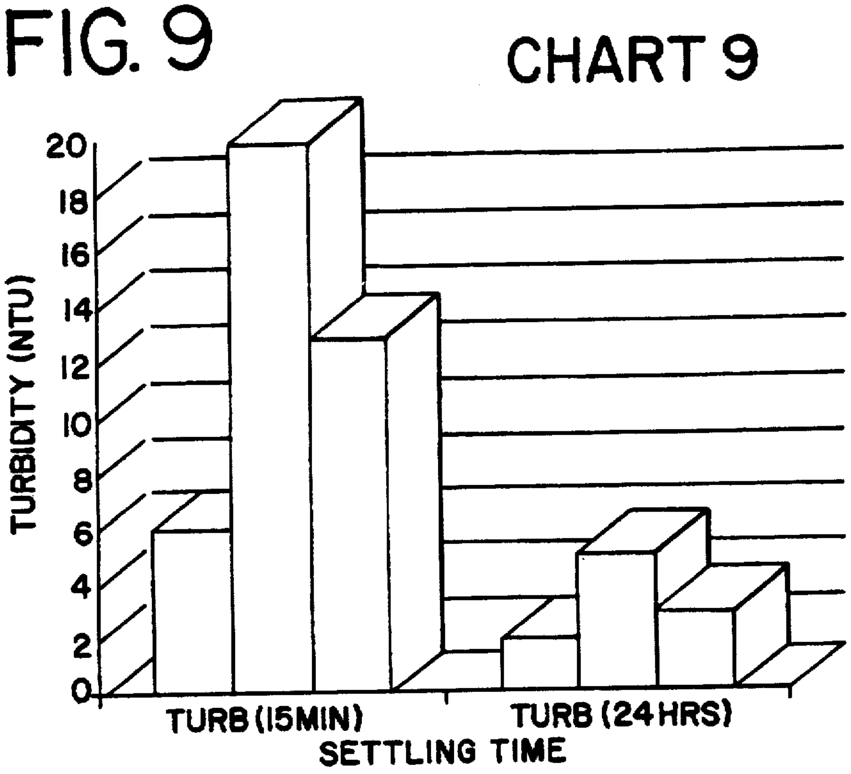
Figure 10:
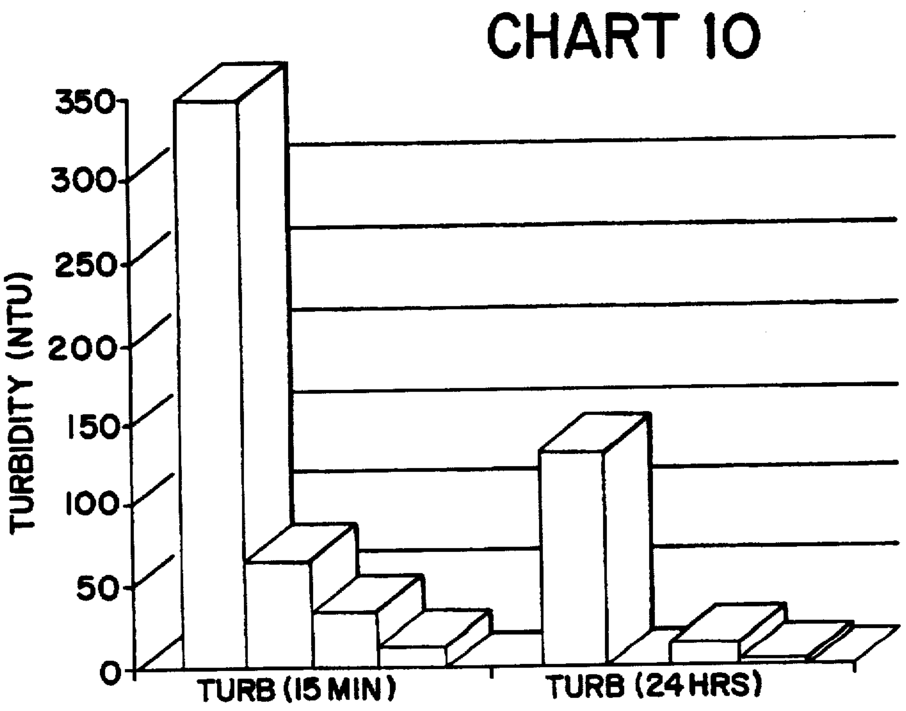

Chart 3 shows the effect of active ingredients on the turbidity of the supernatant layers.

Chart 4 shows the preliminary screening of clarifying additives with an SK-105 solvent.

Chart 5 shows the total suspended solids content of supernatants of some treated samples relative to the control after 70 hours of settling.

Chart 6 shows the quality of supernatants after 60 minutes of settling.

Chart 7 shows the quality of supernatants in additive screening.

Chart 8 shows the turbidity of supernatants after 60 minutes of settling time.

Chart 9 shows turbidity readings after 15 minutes and 24 hours with a combination of active ingredients and clarifing additives in different proportions.

Chart 10 shows the turbidity of supernatants in a control sample and three other specimens after 15 minutes and 24 hours of settling time.

DESCRIPTION OF THE PREFERRED EMBODIMENTS OF THE INVENTION

Inasmuch as one important object of the present invention is to provide a solvent which, when used in a parts cleaning or similar operation, will provide maximum settling out of particulate contaminants in the shortest possible time, with the object of effectively dividing a mass or volume of solvent into a relatively clear supernatant layer overlying a contaminant-rich lower layer of greatly decreased volume in relation to the volume of the supernatant layer, certain baseline criteria were established using existing cleaning solvent. For this purpose, and for providing the controls used in the examples referred to herein, several operations were conducted. Before referring in detail to these operations, a general description of them will be furnished.

The solvent used as a baseline and considered to be typical of contaminated parts washers solvent was taken from parts washing machines in the midwest periodically serviced by the assignee of this invention. Depending upon the duty cycle or the work load at any particular location, parts washers are serviced at varying intervals by picking up old, contaminated solvent and replacing it with new fresh solvent. The pickup intervals usually range from two to twelve weeks.

The solvent in many instances originally comprises a batch of 18 gallons for a 30 gallon parts washer unit of the type shown in U.S. Pat. No. 3,522,814. In the course of servicing each individual parts washer, the residual dirty solvent therefrom is picked up by a serviceperson, and this solvent is ultimately all combined into a holding tank at a service center. Subsequently, such solvent batches are normally collected from the service centers and taken to a recycling center where recycling operations are performed on the solvent.

Thus, in a particular region of the country, the mass of recycled solvent resulting from periodic servicing tends to be of a generally uniform character, although each individual parts washer may be a source of used solvent which is quite different from that of another given individual parts washer. Customarily, the parts washers use a solvent which is primarily an aliphatic petroleum hydrocarbon solvent but may contain up to not more than about 25% aromatic hydrocarbon or up to 20 percent aromatic components, and has a flashpoint of 105° F. or higher (often known commercially as solvent "SK-105"a product of the Safety-Kleen Corp., Elgin, Ill.). This is sometimes referred to herein, and in the charts and tables as a standard solvent. The aliphatic component usually is made up primarily of $C_8$–$C_{13}$ alkanes. In other instances, to which reference will be made, a higher flashpoint solvent, such as a 99+ percent aliphatic Petroleum hydrocarbon solvent is provided, and this solvent has a flashpoint of 140°–150° F. or higher. The hydrocarbons are usually a mix of $C_9$–$C_{15}$ alkanes. This solvent is sometimes referred to herein, and in the charts and tables as solvent "P-150"or "Premium 150", a product of the Safety-Kleen Corp., of Elgin, Ill.

In keeping with the invention, pickup of used solvent or incident to a service call occurs when users of the service encounter one of two conditions. One of these conditions results from a diminution in the effectiveness of the solvent for cleaning purposes when it becomes saturated, or nearly so, with solubilized contaminants such as grease, oil, or other components that are truly soluble in the solvent. In such a case, effective solvent action is no longer possible; the solvent has exhausted its potential as a cleaning agent and is no longer effective. In such a case, recycling is the only choice left.

However, a much more common case is that the solvent is too dirty and contaminated with suspended particulates to continue to be effective. This judgment is usually based on visual observation. Between the time operations are begun with a fresh batch of solvent and the time the service call is made, evaporative losses, contamination from dirt of all kinds, water, etc. occurs; and a gradual dirtying of solvent takes place. This is a natural incident to washing parts in the automotive industry, and/or in manufacturing, construction, agriculture or like industries wherein ferrous and non-ferrous metal mechanical parts are customarily cleaned using parts washer solvent (hereinafter generically referred to as "PWS") and cleaning equipment designed for this purpose.

The contaminated solvent received from a solvent collection and replacement service center was initially analyzed to provide a base-line or control for the various experiments referred to herein. One of the first steps performed was simply to pour a series of specimens or aliquot portions of used solvent into a graduated cylinder, a specially equipped drum, or the like and note the extent to which observable turbidity will spontaneously dissipate, i.e., whether and to what extent to which the solvent will separate spontaneously into two or more layers, one clean and one dirty.

Certain of these experiments are referred to in detail herein, but in summary, it was determined that a certain amount of contamination will settle by gravity within the first half hour after agitation. Thereafter, untreated contaminants tend to remain somewhat uniformly dispersed throughout the mass of solvent, and additional time does not result in material clarification of the solvent. The dispersion depends on a particle size, but in a wide range of sizes, certain particles appear to remain suspended indefinitely. Typically, the total suspended solids ("TSS") in used PWS requiring service were about 1,000–14,000 ppm in the supernatant layer, depending on the application. This is, in effect, an end point beyond which self-cleaning by gravity does not occur.

For purposes of the following discussions of the nature and effect of particle size in solvent classification, the particle size range of solid contaminants suspended in PWS was divided into seven groups, ranging from 70+ microns to 0.45 microns, as is described later.

Regarding settlement rates generally, larger and more dense particles settle out more rapidly. Some particles are large and/or dense enough to settle without assistance in a finite time. Consequently, in a given specimen of solvent, as time passes, the concentration of suspended solids becomes somewhat less near the top of a column of such solvent. However, in general, with particles of 20μ and smaller, these settling rates are so slow that the solvent appears uniformly dirty to the naked eye, and it is the accelerated settling of these particles with which the present invention is primarily concerned.

Referring to another aspect of the present tests, inasmuch as it was desired to test the effectiveness of certain additives in accelerating the rate of settling, i.e., greatly enhancing the extent to which particulate materials would separate from a mass of solvent, another series of steps was carried out. These are a part of a process intended to recognize that solvent in a parts washer initially tends to become dirtied in the process of cleaning, after which the parts washer is not used for a given time, ranging from minutes up to days. The washer is thus used on an intermittent basis or duty cycle throughout the service interval, with additional dirt and contaminants continually finding their way into the solvent over a period of time.

Thus, a material that might be effective to create solids separation from a solvent should desirably be able to remain effective when a treated volume of solvent, already contaminated to a certain extent, is subsequently subjected to additional contamination. To simulate this condition, tests were performed wherein a given batch of solvent was divided into several aliquot portions. When the first aliquot portion was subjected to chemical additions to effect a clarifying or particulate settling action, the supernatant layer contained a greatly diminished level of contaminants. In order to determine the continuing effectiveness of such additives, more contaminants were added in a plurality of subsequent steps.

These subsequent evaluations of settling action were termed "cycles" and were initiated by taking additional individual aliquot portions of the original solvent batch and separating the bottom sediments and water (BS&W), and other contaminants therefrom by centrifuging. After this "spin down" operation was conducted on each of several aliquots, the respective supernatant layers were discarded, and the individual remaining "spun down" contaminants were concentrated contaminants that were then added successively to the supernatant of the original or first aliquot that had been treated with the modifying chemicals. This, in effect, created a standard to determine how effective any particular solvent treatment could be in enhancing separation of contaminants subsequently placed into a given solvent batch. This closely approximates real life or field conditions wherein the solvent continues to be contaminated, while also being allowed periods of non-use wherein settling can occur.

Referring again to certain general aspects of the present invention, it will be therefore appreciated that an advantageous solvent treatment composition will have the advantage of initiating and continuing contaminant separation, preferably at a relatively high rate. Additionally, a favorable product will be able to continue to provide layer formation and contaminant separation generally over a relatively extended period of time. Another aspect, which is equally important, in the visual appearance of the supernatant. This is because its appearance is often a controlling factor in determining when to initiate recycling.

Referring now generally to one aspect of the appearance matter, a number of tests were performed wherein a qualitative visual analysis of the effectiveness of different materials used to create settling can be demonstrated. Here, when a dirty solvent specimen taken from a service center and used as a control is placed in a transparent graduated cylinder, the control substance will typically be a dark grayish-black to brownish-black color with little visual clarity, and will remain turbid for an indefinite period of time. When additives used in accordance with the invention are placed in this solvent, an interface between an upper, clarified layer and a lower, contaminant rich layer appears, and this interface can be seen to move gradually downwardly until an equilibrium is approached or reached.

The height of the interface relative to the original column height at various times, the time required to reach equilibrium and the ultimate position of the interface can all be measured to determine these characteristics. As pointed out, where the solvent is recontaminated, this test is then periodically repeated or put through "cycles" to determine the residual effectiveness of the additive. This is done by adding contaminants and agitating the old, but treated solvent to which new contaminants only have been added.

According to the invention, it was found that a number of products were effective to promote contaminant settling. However, not all products that would promote settling would meet other criteria; some were satisfactory, and some were of acceptable or marginal effectiveness, although not preferred.

As a matter of illustrating the nature of the problem encountered, and so as to distinguish it from liquid processing generally, five specimens of spent parts washer solvent were taken from tanks of collected, used solvent in one or more service centers. Hence, the exact composition of each of the specimens had come from a different source and was different. These are referred to respectively in Chart 1 as feed 1, feed 2, etc. The size distribution of the particles dispersed in the solvent was analyzed. The size classifications are set forth in the following Table 1:

TABLE 1

| SIZE CLASSIFICATION | PARTICLE SIZE RANGE |
|---|---|
| Class 1 | 70μ or larger |
| Class 2 | 30–70μ |
| Class 3 | 20–30μ |
| Class 4 | 10–20μ |
| Class 5 | 5–10μ |
| Class 6 | 1.2–5μ |
| Class 7 | 0.45–1.2μ |

When each of the specimens was analyzed by the above successive filtration, the total suspended solids, expressed in parts per million by weight, within each of the particle size classes was discovered to be as set forth in Chart 1.

In Chart 1, it will be seen that the concentration of suspended solids in class 4, i.e., 10–20μ was much greater than the concentration of any other particle size range. In four of the feeds, there were between 7,500 and almost 11,000 ppm in class 4, i.e., the range of 10–20μ. In one specimen, feed 4, there were about 3,000 ppm of the 70+ micron size particles (class 1), and in feeds 2 and 3, there were about 2,000 ppm each of two different sizes, one being the 30–70 micron size (class 2) and the other comprising about 2,000 ppm of the 5–10μ size (class 5). Thus, the particles sizes sought to be separated fell in greatest proportion within the 10–20 micron size (class 4), such size range containing anywhere from just more than 2 to over 7 times the content of any other size range.

Because of their larger particle size, particles greater than 20–30 microns tend to settle somewhat rapidly by themselves and are therefore not either a significant contributor to the problem of dirty solvent nor do they require unusual treatments. However, those in the 10–20μ and smaller particle size range do require treatment because of their persistence in remaining suspended within the solvent. In Chart 1, therefore, in each set of feeds, the highest bar and the bars to the right thereof represent total suspended solids of the moderate and smaller sizes that require treatment according to the invention.

Regarding the various active ingredient compositions used herein, inasmuch as these are the active ingredient in obtaining the improved performance in the composition, these are sometimes referred to as Active Ingredient 1, Active Ingredient 2, etc., but are usually simply called AI-1, AI-2, etc.

The following is a table of active ingredients that are suitable, at least to some extent, in practicing the invention.

TABLE 2

| LEGEND | ACTIVE INGREDIENT |
|---|---|
| AI-1 | 2-ethyl-1,3-hexanediol |
| AI-2 | Diethylene glycol mono-butyl ether (DEGBE) |
| AI-3 | Propylene glycol n-butyl ether (PnB) |
| AI-4 | A mixture of 2 parts — AI-2 and 1 part AI-3 |
| AI-5 | 1-Pentanol |
| AI-6 | 2-Pentanol |
| AI-7 | Ethylene glycol |
| AI-8 | Diethylene glycol |
| AI-9 | Propylene glycol |
| AI-10 | Ethanol |
| AI-11 | Hexanols |
| AI-12 | Isopropyl Alcohols |

In several cases, the above active ingredients were mixed with an equal amount of water. The amount of water added is up to about 5 parts, preferably from about 0.5 to about 3 parts based on the volume of the entire treated cleaning solvent composition. Such a composition is referred to herein and in the tables as AI-1-W, AI-2-W, etc. All parts expressed herein are by volume unless otherwise noted and are based on 100 parts of solvent.

EXAMPLES 1–3

The settling rate of particles in the solvent composition with various treatments was demonstrated using certain active ingredients, as follows:

| COL | INGREDIENT |
|---|---|
| 1 | CTL |
| 2 | CTL + 2 parts ea. of AI-1 and Water |
| 3 | CTL + AI-1 |
| 4 | CTL + 2 parts Water only |

In the above table, column 1 is the control, i.e., PWS, feed 2, from Chart 1. Column 2 is AI-1-W (2 parts AI-1 plus 2 parts water), Column 3 is the control plus 2 parts AI-1, and Column 4 is the control plus 2 parts water. Time in minutes appears on the horizontal axis.

Chart 2 contains three sets of four vertical columns. In this chart, sets of columns are grouped by settling time. The vertical axis represents the height of a visible interface between a clarified layer and the balance of the solvent. In this case, the graduated cylinder was 100 units high and that is the maximum or 100 value shown. As noted, at a time of zero, there was no visible supernatant layer in any composition.

The entire mass of control liquid initially appeared virtually opaque, being a dirty blackish gray color. After 15 minutes, it is apparent that no interface has developed with the control "CTL" or the control plus water. In other words, the control has not developed an interface and neither has the control with a small amount of added water.

However, with Column 2, an interface has been formed and moved down to a height of 60 units or 60% of the total height of the liquid. The control plus AI-1 above shows an 80 units interface. In the third set of columns, the control CTL and specimen CTL plus 2 parts water have still not yet exhibited an interface even after a period of 60 minutes, or one hour. In the specimen wherein solvent is modified by the addition of AI-1 and 2 parts water, the interface has moved to a level below 25 units. The addition of AI-1 alone has caused the interface to form and move to the 40 unit level. Hence, it is apparent that the addition of a polar solvent as an "active ingredient" and such material with water are both effective to create an interface above which there is a relatively clear liquid and below which there is a layer having a higher concentration of contaminants.

In the foregoing experiments, the appearance of the supernatant in both instances was very clear. Hence, the effect of the active ingredient and the combination of active ingredient and the slight amounts of water were both effective to create a clear supernatant liquid that in use, would create the potential for extended continued use.

EXAMPLES 4 and 5

In addition to the foregoing examples 1–3, which constituted a preliminary test for the settling rate of suspended particles, additional tests were performed wherein the turbidity of the supernatant was measured as referred to herein. Based on studies of solvent generally and experience in the parts washer business, a turbidity number of 40 or less is considered satisfactory, while values of 10 or less are outstanding in that turbidity is substantially invisible to the naked eye. These values are taken at a dilution of 25:1.

For the purposes of analyzing such turbidity in the supernatant layer, a mixture was agitated and permitted to stand. The specimens of the mixture were taken so as to establish an untreated control, a second specimen treated with AI-1 only and a third specimen was treated with AI-1-W. After each of these treatments, the turbidity of the supernatant layer was determined. After 15 minutes, the control showed approximately 350 NTU (Nephelometric Turbidity Units—a measure of scattered light as opposed to transmitted or absorbed light). The specimen treated with AI-1 showed a turbidity of 80 NTU and a specimen treated with AI-1-W showed a turbidity of about 24 NTU.

After 24 hours elapsed, the respective turbidity values were approximately 130, 40, and 4. This is reflected in Chart 3, which reflects turbidity versus time after treatment with AI-1 and AI-1-W. The foregoing was taken as establishing that treatment with the active ingredient only or treatment with the active ingredient plus water were effective to clarify the supernatant in a highly desirable manner.

| COL | INGREDIENT |
|---|---|
| 1 | CTL |
| 2 | AI-1 (2 parts) |
| 3 | 2 parts ea. AI-1 and Water |

In the foregoing chart, turbidity units are NTU. However, the numbers shown in Chart 3 reflect readings taken with specimens that are diluted 25:1 with clean solvent. The readings are consistent throughout, however; in other words, the control was also diluted. In this way, the values were within measurable ranges.

EXAMPLE 6–8

Following the foregoing tests, another series of tests was conducted to determine the effect of the first active ingredient, i.e., the 2-ethyl-1,3-hexanediol plus an equal amount of water (AI-1-W) on a series of specimens that were cycled as per the above discussion.

In the first cycle (Example 6), the control produced interface heights of 100, 100, and 21 units, after respective settling periods of 15, 30, and 60 minutes. The TSS content of the supernatant of the control after 1 hour was determined to be 1489 ppm. With AI-1-W, the same solvent feed was found to produce interface heights of 35, 30, and 23 units after respective settling periods of 15, 30, and 60 minutes. The supernatant of this test (Example 7) was characterized as having 689 ppm of TSS as opposed to 1489 ppm for that of that control.

The supernatant layer from this process was then separated for the next cycle to begin. This separation causes virtually all of the water originally added with the active ingredient to be discarded.

To this supernatant were added additional contaminants resulting from a treatment of the type referred to above, i.e., a similar sample was spun down and the contaminants therefrom were added to the just-treated specimen and allowed to settle. Here, in the control, there was no interface after 60 minutes and the TSS value had risen to 4115.

In the specimen originally treated with 2 parts each of AI-1 and water (AI-1-W) the suspended solids were 1028 after one hour. Because the prior spin-down removed almost all the water, 2 parts more water were added (Example 8), and the TSS reading for the specimen dropped to 563 after one hour. This was done with no additional AI beyond that present in Example 7. This shows that AI appears to be partitioned into the clarified solvent layer rather than the BS and W layer. This example also demonstrates the effect of water in the presence of residual AI-1 on settling rate of suspended particulates.

EXAMPLES 9–12

Following the above preliminary testing wherein 2 parts of active ingredient (AI-1), and 2 parts each of AI-1 and water per hundred parts of solvent (AI-1-W) proved to be highly effective and persistent in their beneficial effects to the solvent, additional tests were conducted utilizing these and other active ingredients in different proportions. Accordingly, using tests similar to those above, i.e., tests to indicate the presence of an interface with a clarified supernatant layer and observations of turbidity, four additional tests were conducted. These tests, respectively, used 1 part per hundred of AI-1 (Example 9); the next involved 1 part per hundred each of AI-1 and water (Example 10); the next test, Example 11, involved using AI-4 in a ratio of 1 part per hundred of solvent and Example 12 involved using 1 part each of AI-4 and water (AI-4-W) per hundred parts of solvent.

All of these tests provided performance exceeding that of the control in regard to the formation of an interface and reduction of turbidity in the supernatant layer. While the examples performed with typical used PWS did not create a supernatant layer as clear as with AI-1-W, and took longer to develop the interfaces, which were generally slightly higher than those using the other active ingredients, the polar solvents in the proportions described were effective to achieve visually apparent turbidity reduction and interface formation in used parts washer solvent. Hence, it was believed that, in addition to the diol (AI-1), the use of $C_6$–$C_8$ glycol ethers proved very effective in a range of concentrations. On an overall basis, however, such glycol ethers were not quite as effective in overall performance as were equal concentrations of additive AI-1 and water (AI-1-W).

EXAMPLES 13–14

In these two examples, the active ingredient was all diethylene glycol mono-butyl ether (AI-2, AI-2-W, Example 13) on the one hand and are propylene glycol n-butyl ether (AI-3 and AI-3-W, Example 14) on the other hand, each at concentrations of 1 pph.

These materials, especially when combined with about equal parts of water (approx. 1 or 2 pph), were successful in turbidity reduction and interface formation but were not as desirable as a mixture of the two, nor as effective as the compositions AI-1 or AI-1-W.

EXAMPLE 15–17

Similar tests were carried out using active ingredients AI-2, AI-3, and AI-4 in a concentration of 2 parts per hundred ("pph") of solvent. The performance of these additives, depending on the degree of solvent contamination, was generally better with the increase to 2 parts per hundred of solvent than with 1 pph solvent, conditions being otherwise the same.

Other tests were conducted which indicate that using active ingredients of the types referred to herein can be effective at levels of down to and less than 0.5 parts per hundred of solvent and up to as much as 5 to 10 parts or higher per hundred parts of solvent. Economics favors using lower concentrations where possible.

EXAMPLES 18–25

Tests were performed respectively utilizing active ingredients identified as AI-5–AI-12 from Table 2 (Examples 18–25).

While these products created some visible improvement to the solvent under certain conditions, a number of these polar solvent type active ingredients had measurable drawbacks. These included, in the case of ethanol and isopropyl alcohol, a measurable reduction in the flashpoint of the solvent. Certain of the glycols were of marginal solubility in the solvent. This is particularly true of the lower molecular weight compositions which tend toward partitioning almost exclusively in the water layer.

In regard to certain of the other active ingredients, while these materials were effective for their intended purposes, some were rejected because of what was deemed an undesirable odor; others created doubts or concerns regarding health risks with long-term exposure and others were less persistent or were partitioned less effectively into the solvent layer.

Referring to the use of still higher molecular weight compounds of the general classification of alcohols, diols, polyols, glycols and glycol ethers, certain of these compositions can also be useful. Compositions above $C_{14}$ were not tested.

An important aspect of the present invention is the ability of the solvent composition, enhanced with the alcohol/diol/polyol/glycol/glycol ether additive, to cooperate with additives which may not otherwise be fully effective in accelerating particle separation and enhancing the quality of the supernatant. Thus, it has been found that, in cooperation with the alcohol/diol/polyol/glycol/glycol ether additive, a combination of products acting to cause or permit agglomeration and settling of contaminant particles, particularly those in the 20 micron and smaller size range, can be further enhanced. Such an action can create a clear appearance almost equal to that of fresh, uncontaminated solvent in a supernatant solvent layer formed within 15 to 60 minutes after agitation.

The extent to which certain materials selected for this purpose are effective can be appreciated in connection with the table set forth below.

Referring now to the clarifying additives which are added to a composition containing one or more active ingredients such as AI-1, AI-2, etc., the following is a representative list of such clarifying additives which have

TABLE 3

| LEGEND | CLARIFYING ADDITIVE |
|---|---|
| CA-1 | A mixture of nonyl and butyl-substituted phenol-formaldehyde resins having plural ethoxy or propoxy groups. See illustration below. |
| CA-2 | CA-1 plus an alkyl or aryl sulfonic acid or mixture. |
| CA-3 | A mixture of petroleum naphtha, ammonium alkyl sulfonates and diethylene glycol mono-butyl ether. (DEGBE) |
| CA-4 | A mixture of petroleum sulfonates, esterified polyols and CA-1. |

In the foregoing, the structure of the main constituent of CA-1 is believed to comprise the following or a similar structure:

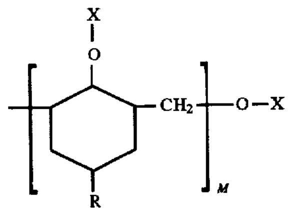

where X=H, Ethoxy or Propoxy and R=$C_3$–$C_{15}$ alkyl

In the preferred compositions, R is $C_4$–$C_9$; n is an integer of 1 or greater, and the molecular weight is usually from 500–10,000.

The foregoing materials were utilized by adding the same, either once or several times in sequence, to a solvent composition that had previously been treated with an active ingredient additive such as AI-1 or AI-1-W, for example. In some instances, the presence of the clarifying additive augmented the desirable characteristics of the solvent treated with the active ingredient, especially when a limited amount of water was present in the composition.

As reflected in the following materials, the clarifying additives were evaluated by various methods as set out below.

A preliminary screening was done using these additives with an SK-105 solvent, to determine whether such additives, with parts washer solvents, would develop an interface, and if so, where and to what extent after a given settling time. The solvent in these examples was not intentionally treated with any other composition.

Chart 4 shows the compositions and the results, with interface height in units on the vertical axis and settling time in minutes on the horizontal axis. Column 1 is the control; Column 2 is CA-4; Column 3 is CA-1; and Column 4 is CA-2.

In these tests, all products were effective, with CA-2 and 4 showing the most promise.

Another test was administered to determine the total suspended solids content of the supernatant after 70 hours of settling. This is shown in Chart 5.

Total suspended solids appear on the vertical axis and the individual products appear in columns to the right as follows:

In Chart 5, only suspended solids of 0.45 micron and larger size are depicted. The left hand column is a control, expressed in terms of TSS, and showing the supernatant of an untreated solvent. Column 2 shows solvent treated with 0.2 pph of CA-3 and 2 pph water. Column 3 is the same as column 2 except that the clarifying except that the clarifying agent is CA-1 and 2 pph of AI-1 is present. Column 5 is the same as column 2 except that no water is present. Column 6 is a solvent treated only with 2 pph each of AI-1 and water.

In these examples, although the active ingredient (AI-1) proved most effective when used only with water, this was true only after a very extended (70 hrs.) time. The duration needed for separation, however, was so long that a much more rapid, even if less complete, separation was sought.

Therefore, the next set of tests, as reflected in Chart 6, shows the quality of the supernatant after only 60 minutes of settling. In Chart 6, The control is compared with a second column treated with CA-4, and a third column reflecting treatment with CA-1. The results range from 250 to 500 parts per million of total suspended solids after 60 minutes.

Chart 7 shows similar findings sing a similar settling time. The performance of another additive, CA-2, is reflected in the fourth column.

Chart 8 is similar to Chart 7 except that the clarity of the supernatant is expressed in terms of turbidity rather than total suspended solids. The first column is the control; the second column is the control after treatment with CA-4; the third column reflects treatment of the control with CA-1 and the fourth column is the control treated with CA-2. In these instances, the turbidity is expressed in units of NTU/5. Consequently, the readings are approximately five times higher than they would be according to the prior example, i.e., where turbidity units are NTU/25. If fully diluted, each of the specimens shown in this chart would equal or approach the 10 unit threshold at which solvent clarity is considered to be outstanding.

Chart 9 shows turbidity readings after fifteen minutes and 24 hours with a combination of ingredients in different proportions. The left hand column shows a control with 0.2 parts CA-2, and 2 parts each AI-1 and water; column 2 shows the same ingredients with 0.2 parts CA-2 but 0.5 part AI-1 and 0.5 part water. The third column shows a concentration of 0.2 parts CA-2 and 1 part each per hundred of solvent of AI-1 and water. It is clear that the turbidity varies with time and also that the order of effectiveness are concentrations of 2 parts, 1 part and ½ part, respectively.

Chart 10 compares the turbidity of supernatant in a control sample and three other specimens after 15 minutes and after 24 hours. In each set of columns, the first column is the control and the second column represents 0.2 pph of CA-1 and 2 pph of water. The third column shows a combination of the control treated with 0.2 pph CA-1 and 2 parts of AI-1. The fourth or last column shows the control treated with 0.2 parts CA-1 and 2 parts each of AI-1 and water. The last composition, the one shown in column 4, is clearly the most effective. Given enough time, as is indicated by the 24 hour term of the second set of data, the 0.2 parts of CA-1 combined with AI-1 in the absence of water is not as effective as is the control, CA-1 and some water. In this connection, however, the better performance in the shorter term is more beneficial as a practical matter. It will also be realized that a certain amount of water may be unavoidably or transiently present in solvent but that most or all of the water is not dispersed therein, at least in the absence of the active ingredient (AI-1).

A number of other similar tests were performed on various combinations of the above active ingredients and clarifying additives. In this connection, it will be realized that, as commercially obtained, each of the clarifying additives includes its own diluent, the character and extent of which varies depending on the exact nature of the clarifying additive. In some instances, the compositions are referred to as from 50 to 75% "active" ingredients, meaning that the sulfonic acids, resins, etc. are present in 50 to 70% of the additive composition. Some ingredients are present in much smaller proportions of the additives as a whole.

Since it is impractical to perform measurements in the absence of such diluent, the proportions given here may not be totally exact with respect to the active components of the additives. The percentages given are those applicable to the products as they are normally packaged and handled. Accordingly, some latitude in the appended claims is also indicated. Actually, a clarifying additive may be present in very small proportions. Thus, if the effective portion of a clarifying additive comprises only 10 or 20% of the entire weight of such additive, then, when an amount such as 0.1 parts per hundred of additive is used on an overall basis, the actual concentration would be 10 times less. By way of example, where 0.1 pph equals 1,000 ppm, in the case of a 10% active material, benefit could be obtained at levels of 100 ppm and less.

From the foregoing, it will be seen that the present invention provides a highly advantageous manner of extending the life of washing solvent by means of a novel action of concentrating the contaminants suspended in the solvent in a lower layer and leaving a supernatant layer of greatly improved quality, all of this occurring in a relatively short period of time.

A very unusual and advantageous aspect of the present invention is that even after creating the ability to cause the solvent to separate into separate layers, one of which is very clear, the active ingredient nevertheless appears to be partitioned in large measure into the supernatant layer.

Consequently, when the lower layer is discarded prior to recycling, the water, sediment, and the like are disposed of but the active ingredient remains largely in the supernatant layer where it can serve to continue to create a cleaned supernatant layer area. Because of the manner in which parts washers are customarily used, this is an extremely, important solvent-prolonging process that is highly favorable to not only economics but also to planetary ecology.

It will thus be seen that the present invention provides improved solvent compositions and methods having a number of advantages and characteristics, including those pointed out herein and others which are inherent in the invention.

A number of examples having been set forth by way of illustration, it is believed that variations and modifications to the described forms of invention will occur to those skilled in the art and that such changes may be made without departing from the spirit of the invention or the scope of the appended claims.

I claim:

1. A treated cleaning solvent composition for providing accelerated and enhanced settling of dispersed contaminants accruing through use in said treated cleaning solvent composition, said composition consisting of, in combination, a cleaning solvent component and an additive component, said cleaning solvent component consisting of more than about 25% aromatic hydrocarbon solvent and the balance $C_9$–$C_5$ aliphatic hydrocarbon solvents, said cleaning solvent component having a flashpoint of at least 100° F.; said additive component being dissolved in said cleaning solvent component to accelerate settling of finely divided contaminant particles tending to create turbidity in said cleaning solvent component, said treated cleaning solvent composition consisting of 100 parts of said cleaning solvent component, and from about 0.01 to about 10 parts of an additive component alone or together with up to 5 parts of water, said additive component being selected from the group consisting of $C_6$—$C_{14}$ alcohols, diols, polyols, and glycol ethers, and mixtures of said alcohols, diols, polyols, and glycol ethers, said additive component in the presence of said dispersed contaminants introduced by using said treated cleaning solvent composition as a washing agent, causing said contaminants in said solvent composition to be partitioned between a lower, contaminant rich-layer and a supernatant layer, said supernatant layer being of substantially greater visual clarity than said lower layer and having a total solids concentration significantly lower than the solids concentration of said lower layer.

2. A treated cleaning solvent composition as defined in claim 1 wherein said additive component consists of $C_6$–$C_8$ alcohols, diols, polyols, and $C_6$–$C_8$ glycol ethers, or mixtures of said alcohols, diols, polyols, and glycol ethers.

3. A treated cleaning solvent composition as defined in claim 1 wherein said additive component consists of $C_6$–$C_8$ aliphatic alcohols, aliphatic diols, aliphatic polyols, $C_6$–$C_8$ aliphatic glycol ethers, or mixtures of said alcohols, diols, polyols, and glycol ethers.

4. A treated cleaning solvent composition as defined in claim 1 wherein said additive component is selected from the group consisting of 2-ethyl-1,3-hexanediol, diethylene glycol mono-butyl ether and propylene glycol butyl ether and mixtures of said hexanediol and said glycol ethers.

5. A treated cleaning solvent composition as defined in claim 1 wherein said additive component is 2-ethyl-1,3-hexanediol.

6. A treated cleaning solvent composition as defined in claim 1 wherein said additive component is diethylene glycol mono-butyl ether.

7. A treated cleaning solvent composition as defined in claim 1 wherein said additive component is propylene glycol n-butyl ether.

8. A treated cleaning solvent composition as defined in claim 1 wherein said additive component is a mixture of diethylene glycol mono-butyl ether and propylene glycol n-butyl ether in a ratio of from about one to three parts of said diethylene glycol mono-butylether and one to three parts of said propylene glycol n-butylether.

9. A treated cleaning solvent composition as defined in claim 1 wherein said water in said treated cleaning solvent composition is present in an amount of from about 0.5 to about 3 parts water, based on the volume of the entire treated cleaning solvent composition.

10. A treated cleaning solvent composition as defined in claim 5, wherein said water in said additive component is present in and amount of from about 0.5 to 5 parts water, based on the volume of the entire treated cleaning solvent composition.

11. A treated cleaning solvent composition as defined in claim 1, wherein said cleaning solvent component consists of at least 99% aliphatic hydrocarbon, exclusive of said additive component, said hydrocarbon solvent having a flashpoint of at least 100° F. and consisting of $C_8$–$C_{14}$ aliphatic hydrocarbons.

12. A method of treating a contaminated cleaning solvent composition to provide accelerated and enhanced settling of finely dispersed contaminants accruing through use in said cleaning solvent composition, said method consisting of adding to 100 parts of a cleaning solvent composition consisting of not more than about 25% aromatic solvent and the balance $C_9$—$C_{15}$ aliphatic hydrocarbon solvents, said cleaning solvent composition having a flashpoint of at least 100° F., a treatment additive consisting of from about 0.01 to about 5.0 parts of a compound selected from the group consisting of $C_6$–$C_{14}$ alcohols, diols, polyols, glycol ethers, mixtures of said alcohols, diols, polyols and glycol ethers and mixtures thereof with up to 5 parts of water, whereby said additive, in the presence of dispersed contaminants introduced by using said cleaning solvent composition as a washing agent, will cause said accrued contaminants in said solvent composition to be partitioned so as to create a lower, contaminant-rich solvent-layer and a supernatant solvent layer, said supernatant layer being of substantially greater visual clarity than said lower layer and having a total solids concentration significantly lower than the solids concentration of said lower layer.

13. A method as defined in claim 12 wherein said treatment additive (composition) consists of $C_6$–$C_8$ alcohols, $C_6$–$C_8$ diols, $C_6$–$C_8$ polyols, $C_6$–$C_8$ glycol ethers or mixtures of said alcohols, diols, polyols, and glycol ethers.

14. A method as defined in claim 12 wherein said treatment additive is selected from the group consisting of 2-ethyl-1,3-hexanediol, diethylene glycol mono-butyl ether, propylene glycol butyl ether, and mixtures of said diol and said glycol ethers.

15. A method as defined in claim 12 wherein said treatment additive is 2-ethyl-1,3-hexanediol.

16. A method as defined in claim 12 wherein said treatment additive is diethylene glycol mono-butyl ether.

17. A method as defined in claim 12 wherein said treatment additive is propylene glycol n-butyl ether.

18. A method as defined in claim 12, wherein said treatment is a mixture of diethylene glycol mono-butyl ether and propylene glycol n-butyl ether in a ratio of from about one to three parts of said diethylene glycol mono-butyl ether and one to three parts of said propylene glycol n-butyl ether.

19. A method as defined in claim 12 wherein about 0.5 to 5 parts of water is added to said cleaning solvent composition.

* * * * *